US008813723B2

(12) United States Patent
Bagnasco et al.

(10) Patent No.: US 8,813,723 B2
(45) Date of Patent: Aug. 26, 2014

(54) SYSTEM AND METHOD FOR DETECTING A STUCK FUEL INJECTOR

(75) Inventors: Andrew P. Bagnasco, Plymouth, MI (US); Yue-Ming Chen, Canton, MI (US); Sanjeev M. Naik, Troy, MI (US)

(73) Assignee: GM Global Technology Operations LLC

( * ) Notice: Subject to any disclaimer, the term of this patent is extended or adjusted under 35 U.S.C. 154(b) by 232 days.

(21) Appl. No.: 13/444,157

(22) Filed: Apr. 11, 2012

(65) Prior Publication Data

US 2012/0296553 A1   Nov. 22, 2012

Related U.S. Application Data

(60) Provisional application No. 61/488,489, filed on May 20, 2011.

(51) Int. Cl.
*F02M 51/00* (2006.01)
*F02M 51/06* (2006.01)

(52) U.S. Cl.
USPC .......................................... 123/490; 123/478

(58) Field of Classification Search
USPC ................. 123/490, 497, 499, 488, 472, 478; 701/103; 73/114.45
See application file for complete search history.

(56) References Cited

U.S. PATENT DOCUMENTS

| 5,469,825 | A  | * | 11/1995 | Golab et al. | 123/479 |
| 6,880,530 | B2 | * | 4/2005  | Oyama et al. | 123/479 |
| 7,640,918 | B2 | * | 1/2010  | Perryman et al. | 123/479 |
| 7,917,310 | B2 | * | 3/2011  | Pearce et al. | 702/38 |
| 7,931,008 | B2 |   | 4/2011  | Verner et al. | |
| 2004/0118384 | A1 | * | 6/2004 | Oyama et al. | 123/479 |
| 2007/0227506 | A1 | * | 10/2007 | Perryman et al. | 123/479 |
| 2009/0132180 | A1 | * | 5/2009 | Pearce et al. | 702/38 |
| 2012/0296551 | A1 | * | 11/2012 | Kabasin | 701/103 |

* cited by examiner

*Primary Examiner* — Mahmoud Gimie (57) ABSTRACT

A control system for an engine is presented. The control system can include a transition period waveform monitor module, a stuck fuel injector detection module, and a fuel injection control module. The transition period waveform monitor module measures an electrical signal of a fuel injector upon deactivation of the fuel injector. The stuck fuel injector detection module detects a stuck fuel injector when an accumulated deviation of the electrical signal from a parameterized estimated reference waveform is outside of a predetermined range. The fuel injection control module controls fuel injection in the engine based on the detection of the stuck fuel injector.

20 Claims, 9 Drawing Sheets

SYSTEM AND METHOD FOR DETECTING A STUCK FUEL INJECTOR

CROSS-REFERENCE TO RELATED APPLICATIONS

This application claims the benefit of U.S. Provisional Application No. 61/488,489, filed on May 20, 2011. The disclosure of the above application is incorporated herein by reference in its entirety.

FIELD

The present disclosure relates to internal combustion engines and more particularly to a system and method for detecting a stuck fuel injector.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an induction system that may be regulated by a throttle. The air in the intake manifold is distributed to a plurality of cylinders and combined with fuel to create an air/fuel (NF) mixture. The fuel may be injected by a plurality of fuel injectors via intake ports of the cylinders or directly into the cylinders, respectively. The fuel injectors may inject fuel either once per combustion cycle (single pulse fuel injection) or multiple times per combustion cycle (multi-pulse fuel injection). The A/F mixture is compressed by pistons within the cylinders and then combusted. For example, multi-pulse fuel injection may provide for more efficient combustion and therefore may decrease engine emissions. The combustion of the NF mixture drives the pistons which rotatably turn a crankshaft and generate drive torque for propelling a vehicle.

SUMMARY

A control system for an engine is presented. The control system can include a transition period waveform monitor module, a stuck fuel injector detection module, and a fuel injection control module. The transition period waveform monitor module measures an electrical signal of a fuel injector upon deactivation of the fuel injector. The stuck fuel injector detection module detects a stuck fuel injector when an accumulated deviation of the electrical signal from a parameterized estimated reference waveform is outside of a predetermined range. The fuel injection control module controls fuel injection in the engine based on the detection of the stuck fuel injector.

A method for controlling an engine is also presented. The method includes measuring an electrical signal of a fuel injector upon deactivation of the fuel injector. The method includes detecting a stuck fuel injector when an accumulated deviation of the electrical signal from a parameterized estimated reference waveform is outside of a predetermined range. The method also includes controlling fuel injection in the engine based on the detection of the stuck fuel injector.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A fuel injector may include a solenoid that generates a magnetic field when supplied with a current or a voltage. Specifically, the magnetic field displaces a needle of the fuel injector thereby opening the fuel injector. When opened, the fuel injector may inject pressurized fuel into an intake port of a cylinder of an engine or directly into the cylinder. The pressurize fuel may be supplied by a fuel rail. Similarly, removing the supplied current/voltage from the solenoid removes the magnetic field thereby returning the needle to a default position, e.g., fully closed and stopping fuel injection into the engine.

The fuel injector may also perform more than one fuel injection during a fuel injection period of an engine combustion cycle. For example, increasing a number of fuel injections per fuel injection period may increase combustion efficiency and/or decrease emissions. The fuel injections during a fuel injection period may also be referred to as fuel injection "pulses."

One or more fuel injection pulses may not be delivered due to a faulty fuel injector. The failed fuel injector pulse can also be referred to as a "stuck fuel injector." In other words, the fuel injector may not perform a desired number of fuel injections during the fuel injection period. Conventional control systems may detect a failed fuel injection pulse using a misfire diagnostic system. Using a misfire diagnostic system to detect a failed fuel injection pulse, however, imposes constraints on the duration of each fuel injection pulse, thereby increasing emissions.

Accordingly, a system and a method for detecting failed fuel injection pulses are presented. The system and method may be implemented for fuel injectors operating either ballistically or non-ballistically, and without the use of oxygen (O2) sensor feedback. The system and method may measure an electrical signal of a fuel injector upon deactivation of the fuel injector. The system and method may then detect a stuck fuel injector when an accumulated deviation of the electrical signal from a parameterized estimated reference waveform is outside of a predetermined range. The system and method may then control fuel injection in the engine based on the detection of the stuck fuel injector.

Figure 1:
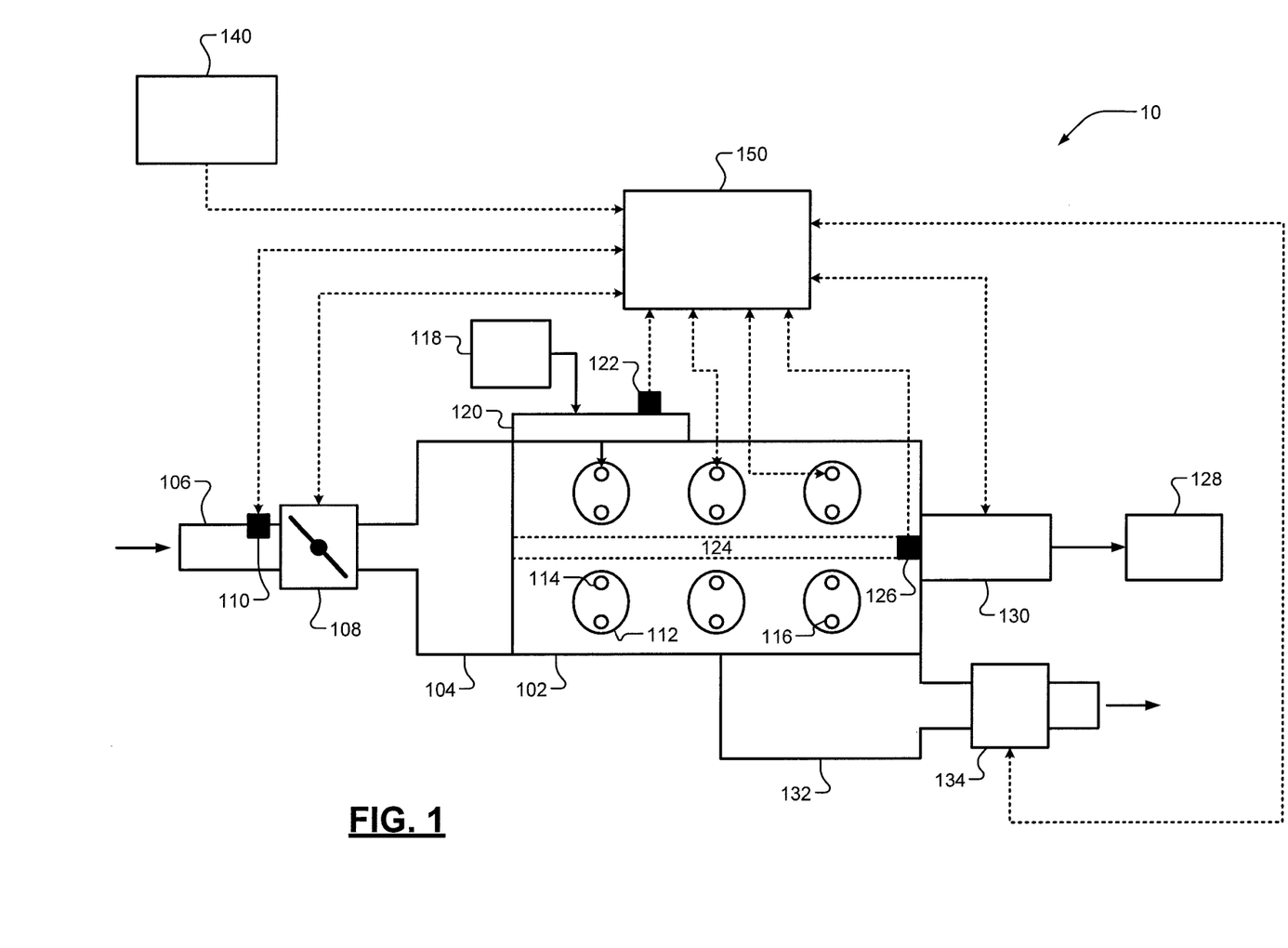
FIG. 1 is a functional block diagram of an example engine system according to one implementation of the present disclosure.

Referring now to FIG. 1, an example of an engine system 100 that includes an engine 102 is shown. The engine 102 may be a spark ignition (SI) engine, a diesel engine, a homogeneous charge compression ignition (HCCI) engine, or another suitable type of engine. In addition, the engine system 100 may be a hybrid system and therefore may include additional components such as, but not limited to, an electric motor and a battery system.

The engine 102 draws air into an intake manifold 104 through an induction system 106 that may be regulated by a throttle 108. For example, the throttle 108 may be electrically controlled via electronic throttle control (ETC). A mass air flow (MAF) sensor 110 measures a MAF through the throttle 108 and into the intake manifold 104. The air in the intake manifold 104 is distributed to a plurality of cylinders 112 and combined with fuel to create an air/fuel (A/F) mixture. While six cylinders are shown, the engine 102 may include other numbers of cylinders.

Fuel injectors 114 may inject the fuel to create the A/F mixture. For example, the fuel injectors 114 may inject the fuel into intake ports of the cylinders 112, respectively, or directly into the cylinders 112, respectively. The A/F mixture is compressed by pistons (not shown) within the cylinders 112. Depending on the type of engine 102, spark plugs 116 may ignite the compressed A/F mixture. Alternatively, the A/F mixture may be compressed until auto-ignition occurs. A fuel tank 118 may selectively supply a fuel rail 120 with pressurized fuel (e.g., via a fuel pump). A fuel rail pressure sensor 122 measures a pressure of the fuel in the fuel rail 120. The fuel rail 120 supplies pressurized fuel to the fuel injectors 114 for injection into the engine 102.

The combustion of the A/F mixture within the cylinders drives the pistons (not shown) which rotatably turn a crankshaft 124 and generate drive torque. An engine speed sensor 126 measures a rotational velocity (i.e., speed) of the crankshaft 124. For example, the engine speed sensor 126 may measure engine speed in revolutions per minute (RPM). The drive torque at the crankshaft 124 is transferred to a driveline 128 of a vehicle via a transmission 130. For example, the transmission 130 may be coupled to the crankshaft 124 via a fluid coupling such as a torque converter (not shown).

Exhaust gas resulting from combustion is expelled from the cylinders 112 into an exhaust manifold 132. The exhaust gas in the exhaust manifold 132 may be treated by an exhaust treatment system 134 before being released into the atmosphere. For example, the exhaust treatment system 134 may include at least one of an oxidation catalyst (OC), nitrogen oxide (NOx) adsorbers/absorbers, a lean NOx trap (LNT), a selective catalytic reduction (SCR) system, a particulate matter (PM) filter, and a three-way catalytic converter. A driver input module 140 translates input from the driver of the vehicle (e.g., via an accelerator pedal) for a control module 150.

The control module 150 controls operation of the engine system 100. The control module 150 may receive signals from the throttle 108, the MAF sensor 110, the fuel injectors 114, the spark plugs 116, the fuel rail pressure sensor 122, the engine speed sensor 126, the transmission 130, the exhaust treatment system 134, and/or the driver input module 140. The control module 150 may control the throttle 108, the fuel injectors 114, the spark plugs 116, the transmission 130, and/or the exhaust treatment system 134. The control module 150 may also implement the system or method of the present disclosure.

Figure 2:
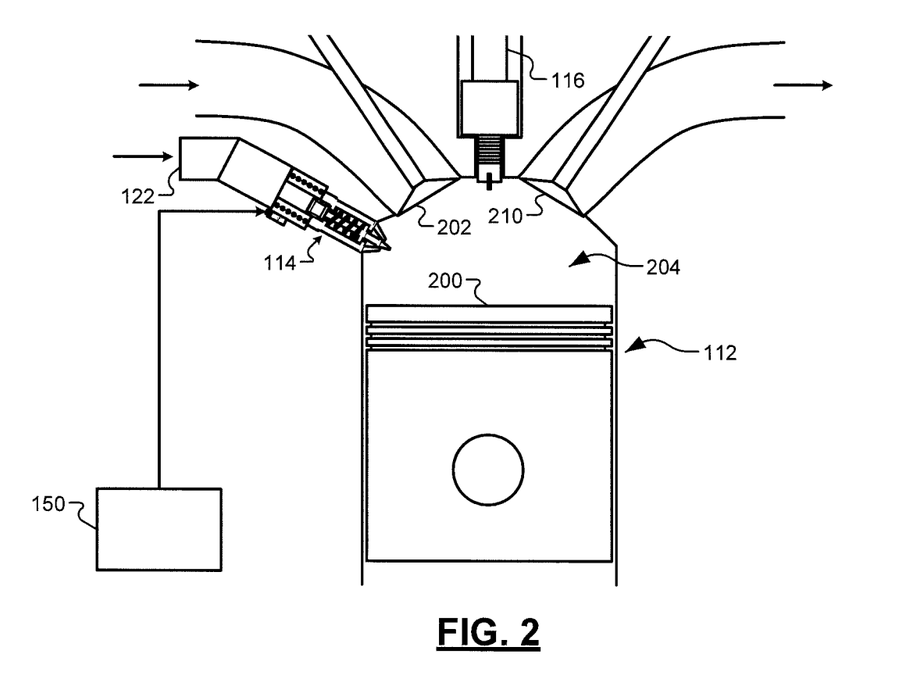
FIG. 2 is a cross-sectional diagram of an example cylinder of the example engine system according to one implementation of the present disclosure.

Referring now to FIG. 2, a cross-sectional view of the cylinder 112 is shown. The cylinder 112 includes a piston 200. The fuel injector 114 and the spark plug 116 may be connected to the cylinder 112. An intake valve 202 regulates an amount of intake air drawn into a combustion chamber 204. The control module 150 may actuate the fuel injector 114 to inject fuel from the fuel rail 122 into the combustion chamber 204. The control module 150 may actuate the fuel injector 114. The spark plug 116 may ignite the fuel in the combustion chamber 204. An exhaust valve 210 may open to allow exhaust gas to leave the combustion chamber 204. While the cylinder 112 is shown to include the fuel injector 114, the fuel injector 114 may inject fuel outside of the cylinder 112 (i.e. port fuel injection).

Figure 3A:
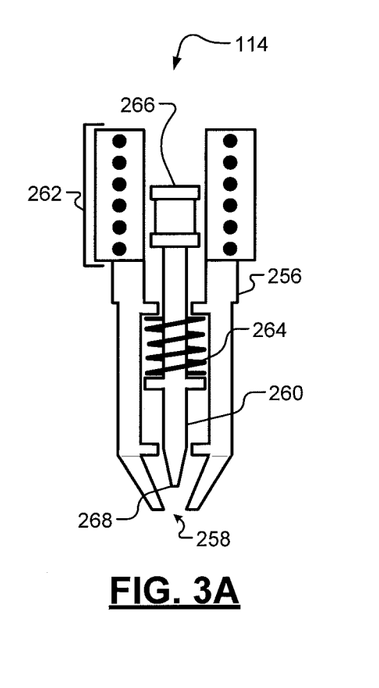
FIG. 3A is a cross-sectional diagram of a fuel injector having a needle in an open position according to one implementation of the present disclosure.
Figure 3B:
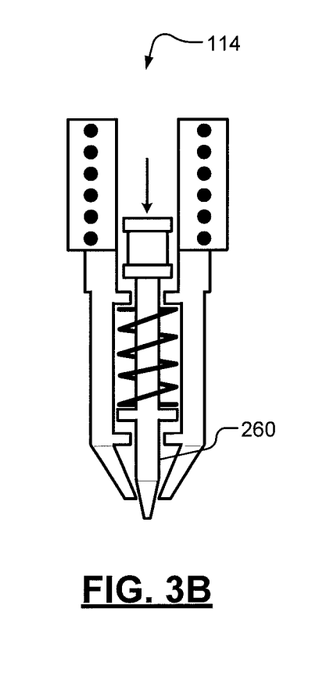
FIG. 3B is a cross-sectional diagram of the fuel injector having a needle transitioning from the open position to a closed position according to one implementation of the present disclosure.
Figure 3C:
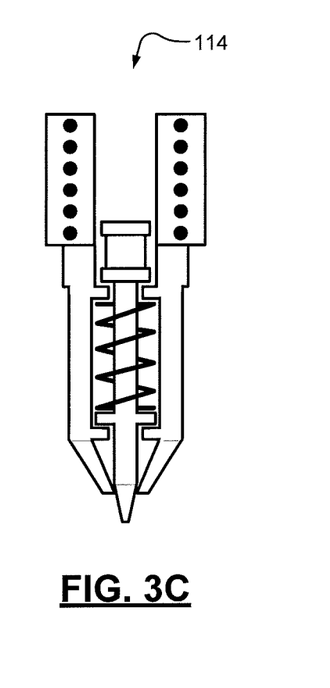
FIG. 3C is a cross-sectional diagram of the fuel injector having a needle in the closed position according to one implementation of the present disclosure.

Referring now to FIGS. 3A-3C, a first implementation of the fuel injector 114 may include a fuel injector housing 256, an outlet 258, a needle 260, a solenoid 262, and a spring 264. The fuel injector 114 may be connected to the engine 102 via the housing 256. The control module 150 may apply power to the solenoid 262 to generate a magnetic field in the core of the solenoid 262. Magnetic flux may refer to an amount of magnetic field flowing through the solenoid 262. Applying power to the solenoid 262 may be referred to hereinafter as "activating the fuel injector 114." Accordingly, the control module 150 may activate the fuel injector 114 to generate a magnetic field in the core of the solenoid 262.

Reducing power to the solenoid 262 may be referred to hereinafter as "deactivating the fuel injector 114." For example, the control module 150 may supply zero power to the fuel injector 114 when the fuel injector 114 is deactivated. Accordingly, the magnetic field in the solenoid 262 will collapse when the control module 150 deactivates the fuel injector 114. Magnetic flux decay may refer to the decay (i.e., breakdown) of the magnetic flux flowing through the solenoid 262. Therefore, magnetic flux decay may be proportional to the closing period of the needle 260 of the fuel injector 114.

The needle 260 may include a needle head 266 and a needle tip 268. The needle head 266 may be positioned proximate to the solenoid 262 when the fuel injector 114 is deactivated. The control module 150 may activate the fuel injector 114 to draw the needle head 266 into the solenoid 262. Accordingly, the control module 150 may activate the fuel injector 114 to draw the needle tip 268 into the injector housing 256. The outlet 258 of the fuel injector 114 may be open when the needle tip 268 is drawn into the injector housing 256. Hereinafter, the needle 260 may be referred to as being in an open position when the control module 150 activates the fuel injector 114. The needle 260 of FIG. 3A is in the open position. Fuel may flow through the outlet 258 and into the combustion chamber 204 when the needle 260 is in the open position. While the fuel injector 114 is illustrated and described as injecting fuel when the needle 260 is drawn into the injector housing 256, alternative injectors may inject fuel using a needle that protrudes from the housing 256.

The spring 264 may force the needle 260 into a closed position when the control module 150 deactivates the fuel injector 114. Accordingly, the needle 260 may transition from the open position to the closed position when the fuel injector 114 is deactivated. FIG. 3B illustrates a transition of the needle 260 from the open position to the closed position. The needle 260 may be in the closed position a period of time after deactivation of the fuel injector 114, also referred to as a closing period of the needle 260 of the fuel injector 114. Fuel may not flow through the outlet 258 and into the combustion chamber 204 when the needle 260 is in the closed position. FIG. 3C illustrates the needle 260 in the closed position.

The control module 150 may apply power (e.g., a pulse) to activate the fuel injector 114 over a period of time (hereinafter "pulse period"). Fuel may flow through the outlet 258 and into the combustion chamber 204 during the pulse period. The control module 150 may change a length of the pulse period to control an amount of fuel injected into the combustion chamber 204. The control module 150 may increase the length of the pulse period to increase the amount of fuel injected into the combustion chamber 204. The control module 150 may decrease the length of the pulse period to decrease the amount of fuel injected into the combustion chamber 204. Additionally or alternatively, the control module 150 may control a number of fuel injection pulses per engine combustion cycle.

The pulse used to activate the fuel injector 114 may be described as a primary pulse or a secondary pulse. The primary pulse may have a relatively longer pulse period than the secondary pulse. For example only, a primary pulse may draw the needle head 266 into the solenoid 262 until the needle head 266 reaches a stable position that yields a constant flow rate.

The secondary pulse may be a pulse having a relatively short pulse period. For example only, the secondary pulse may have a pulse period of less than 500 µs. The secondary pulse may also refer to a pulse applied after the primary pulse. In some implementations, one or more secondary pulses may be applied after a primary pulse within one cylinder cycle (i.e., split injection). For example, the secondary pulse may be applied to provide a fraction of the fuel of the primary pulse (e.g., 40% of the primary pulse) after the primary pulse is applied.

The secondary pulse may draw the needle head 266 into the solenoid 262 a shorter distance than the primary pulse because of the shortened pulse period. A relationship between a quantity of fuel injected and pulse duration may be nonlinear when the pulse is a secondary pulse. A relationship between a quantity of fuel injected and pulse duration may be linear when the pulse is a primary pulse. The control module 150 may apply the secondary pulse to inject a reduced amount of fuel. For example, the control module 150 may apply a primary pulse followed by secondary pulses to control combustion processes in the engine 102. Additionally, the control module 150 may apply the secondary pulses to control a temperature and composition of exhaust gas to aid in control of emissions.

As previously described, while primary and secondary pulses are described above, the fuel injector 114 may also be described as performing N fuel injection pulses per fuel injection period, where N is an integer greater than or equal to 2. In addition, the fuel injector 114 may also fail to inject fuel when the control module 150 activates the fuel injector 114 for the pulse period. A failure to inject fuel in response to a pulse from the control module 150 may be referred to hereinafter as a "failed fuel injection pulse."

The control system and method of the present disclosure are generally applicable to any type of fuel injectors which include, but are not limited to, top-feed injectors and side-feed injectors. Similarly, the control system and method of the present disclosure are generally applicable to any type of fuel injector nozzles which include, but are not limited to, needle (pintle) nozzles, disc nozzles, and ball-type nozzles.

Figure 4:
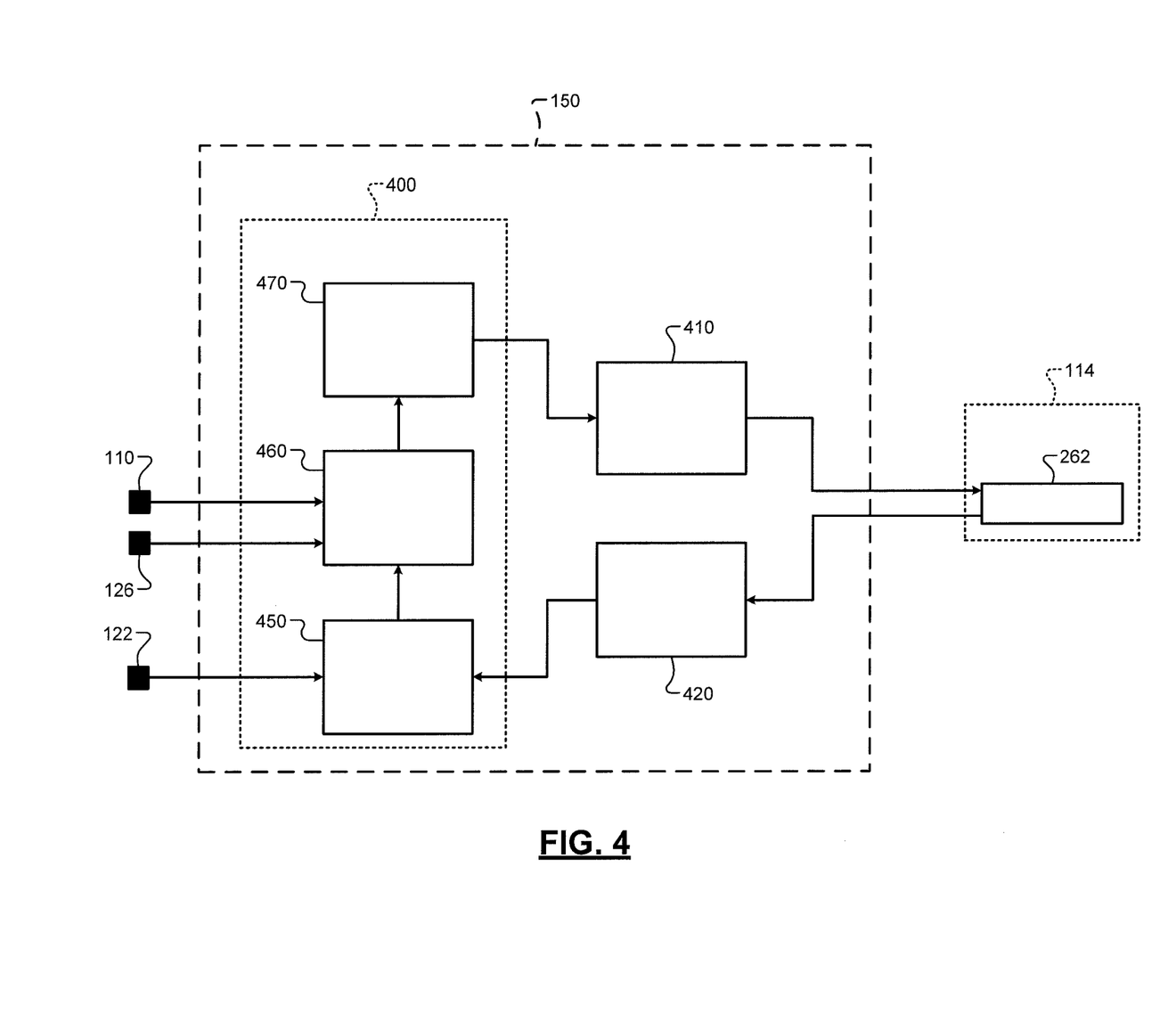
FIG. 4 is a functional block diagram of an example control module according to one implementation of the present disclosure.

Referring now to FIG. 4, an example of the control module 150 is shown. The control module 150 may include a plurality of processors 400, a solenoid driver 410, and a current/voltage sensing circuit 420. The plurality of processors 400 can include a transition period waveform monitor module 450, a stuck fuel injector detection module 460, and a fuel injection control module 470. For example, the plurality of processors 400 can individually or collectively execute the functionality of modules 450, 460, and 470. In addition, for exemplary purposes only, the control module 150 is described herein as interacting with the first implementation of the fuel injector 114 from FIGS. 3A-3C. Alternatively, the control module 150 could be configured to interact with alternative fuel injector configurations as previously described.

The plurality of processors 400 in the control module 150 are used for the controlling the engine fuel injection system. It should be appreciated that while a plurality of processors 400 are shown and described herein, a single processor could be implemented to execute each of the modules 450, 460, and 470. The fuel injection control module 470 sends command to the solenoid driver 410 at the appropriate time in the engine cycle, e.g. peak and hold, so the solenoid driver 410 delivers the required current to activate the solenoid 262 of the fuel injector 114. The voltage/current sensing circuit 420 detects the level of voltage across the solenoid 362 and provides an indicative signal to the transition period waveform monitor module 450. The voltage/current sensing circuit 420 could also detect the level of current flowing through the solenoid 362 and provide an indicative signal to the transition period waveform monitor module 450.

Figure 5:
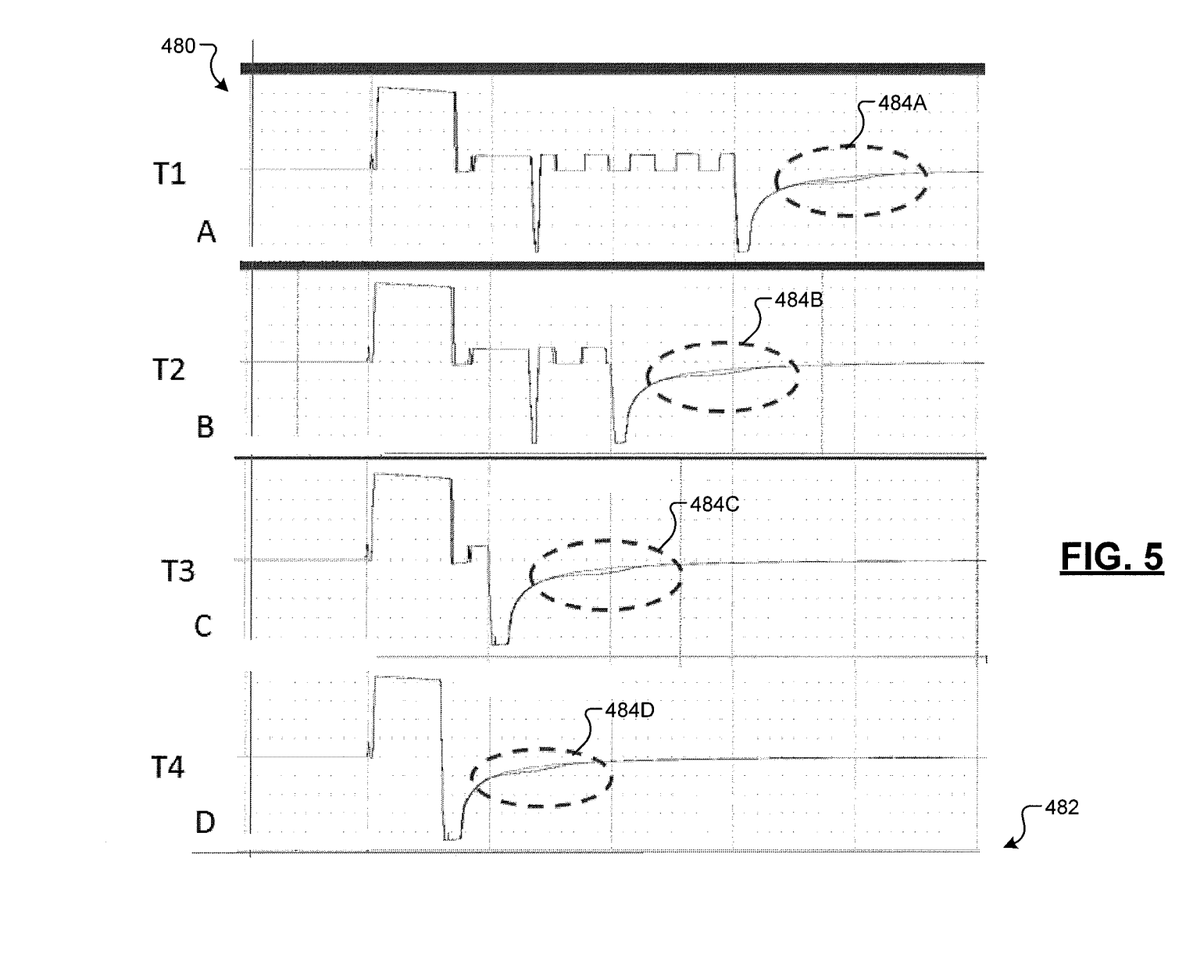
FIG. 5 is graphs of simulated fuel injector pulses for normal and stuck fuel injectors for four different injector pulse durations.

Referring now to FIG. 5, four graphs (A-D) illustrate different simulations of fuel injection pulses. A common vertical axis 480 represents voltage and a common horizontal axis 482 represents time. The fuel injection pulses represent the output voltage signals from the injector coil, which produces different quantities of fuel into the cylinder at various engine operating conditions. Each pulse has a corresponding transition period (484A-484D, respectively) during which accumulated deviation can be determined. It should be appreciated that the four graphs A-D illustrate example results and are used for demonstrative purposes. In a spark-ignition, direct injection (SIDI) engine, fuel may be injected at various times during a combustion cycle. This increased control that may be associated with a SIDI engine provides for increased horsepower, reduced emissions, and knock suppression.

Figure 6:
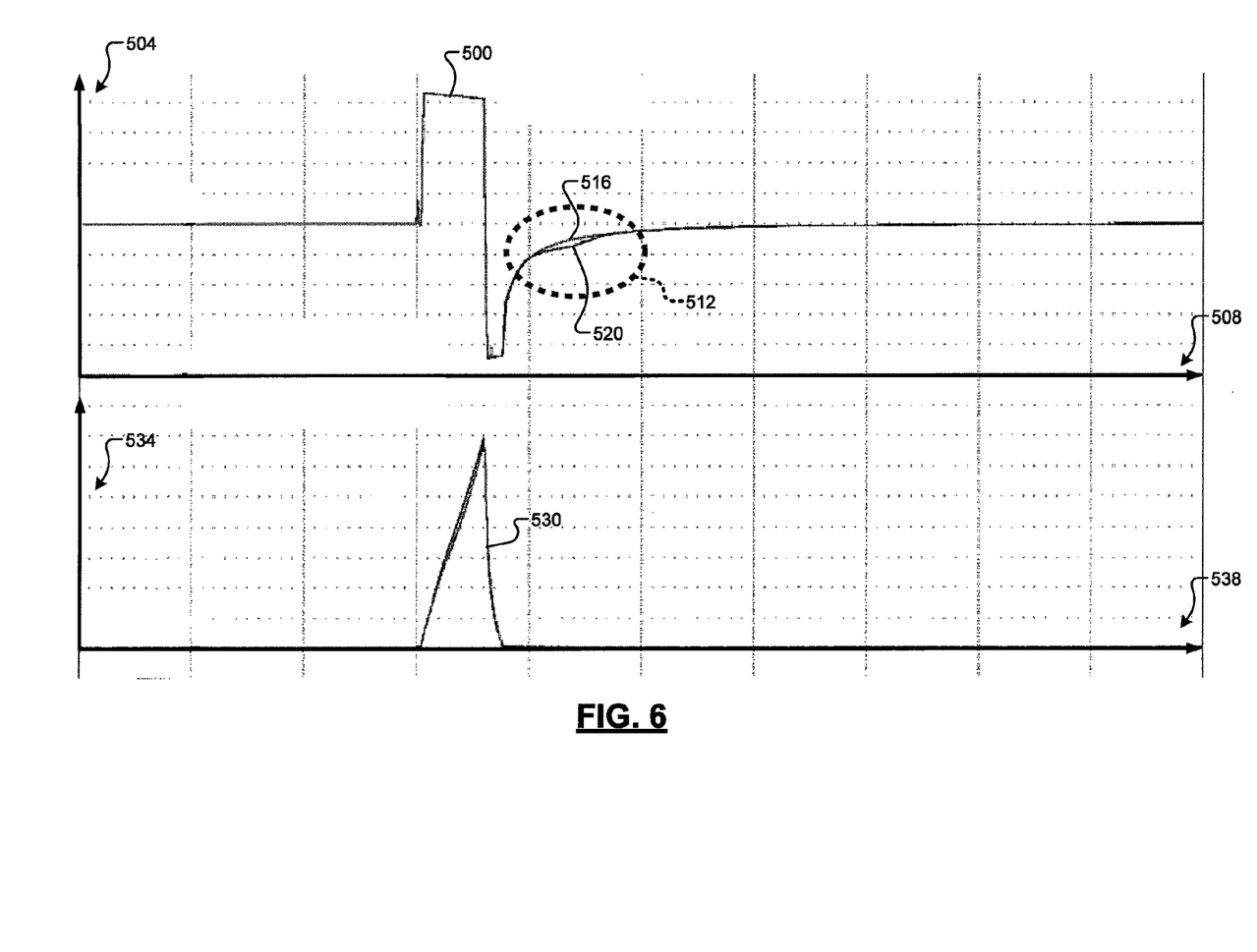
FIG. 6 is a graph illustrating simulated voltage and current traces for normal and stuck open/closed fuel injectors for one of the injector pulse durations of FIG. 5.

Pulse duration T4 (graph D, period 484D) will now be used for demonstration in FIG. 6. When the fuel injector 114 is turned ON, a voltage trace 500 moves upward towards a supplied battery voltage. A vertical axis 504 represents voltage, e.g., in volts (V), and a horizontal axis 508 represents time, e.g., 500 microseconds (us) per division. When the fuel injector 114 is turned OFF, the voltage trace 500 spikes downward as the magnetic field surrounding the coil winding of the fuel injector 114 collapses. Then the voltage trace 500 decays to zero and the solenoid 262 closes the fuel injector 114. As shown in region 512, there is a difference in the voltage decay for a normal fuel injector (reference 516) compared to the voltage decay for a stuck fuel injector (reference 520). Similarly, when the fuel injector 114 is turned on, a current trace 530 moves upward towards a supplied current. A vertical axis 534 can represent current, e.g., in amps (A), and a horizontal axis 538 can represent time, e.g., 500 us/division. When the fuel injector 114 is turned OFF, the current trace 510 decays to zero and the solenoid 262 closes the fuel injector 114.

Referring again to FIG. 4, the transition period waveform monitor module 450 communicates with the solenoid 262 of the fuel injector 114. Specifically, the transition period waveform monitor module 450 receives the electrical signal of the fuel injector 114. The electrical signal can indicate (i) measured current flowing through the solenoid 262, (ii) measured voltage drop across the solenoid 262, or a combination thereof. The transition period waveform monitor module 450 can monitor the electrical signal. The electrical signal can be monitored during a transition period of the fuel injector 114.

The stuck fuel injector detection module 460 can determine an accumulated deviation of the electrical signal from a parameterized estimated reference waveform. For example, this waveform can be stored in memory. The accumulated deviation may represent a deviation of the electrical signal from the reference waveform during the transition period of the fuel injector 114. The stuck fuel injector detection module 460 can detect a stuck fuel injector when the accumulated deviation of the electrical signal from the parameterized estimated reference waveform is outside of a predetermined range.

Based on at least one of the measured current and the measured voltage (the electrical signal), the stuck fuel injector detection module 460 can also determine magnetic flux decay in the solenoid 262. The stuck fuel injector detection module 460 can determine the transition period of the fuel injector 114 based on the magnetic flux decay. It should be appreciated that the transition period waveform monitor module 450 can also determine the transition period. Accordingly, the stuck fuel injector detection module 460 can determine the accumulated deviation based on the magnetic flux decay. For example, the transition period of the needle 260 of the fuel injector 114 may be determined based on the determined magnetic flux decay using a look-up table.

The transition period waveform monitor module 450 may also receive a signal from the fuel rail pressure sensor 122 indicating fuel rail pressure. The transition period waveform monitor module 450 may determine the transition period of the needle 260 of the fuel injector 114 further based on the measured fuel rail pressure and/or cylinder pressure. For example, the cylinder pressure may be estimated based on other engine operating parameters. Alternatively, cylinder pressure sensors may be implemented to directly measure the cylinder pressure.

When the determined transition period is within the predetermined range, a proper fuel injection pulse is detected and the stuck fuel injector detection module 460 can notify the fuel injection control module 470 to continue normal fuel injection control.

The stuck fuel injector detection module 460 may also receive signals indicating MAF and engine speed from the MAF sensor 110 and the engine speed sensor 126, respectively. The stuck fuel injector detection module 460 may determine air/fuel (A/F) imbalance based on the MAF and a commanded amount of fuel injection. For example, the A/F imbalance may indicate a difference between a commanded A/F ratio and a desired A/F ratio. The stuck fuel injector detection module 460 may detect a stuck fuel injector further based on at least one of the A/F imbalance, engine speed, and individual cylinder fuel control.

The fuel injection control module 470 can receive a signal indicating a stuck fuel injector from the stuck fuel injector detection module 460. The fuel injection control module 470 may control fuel injection based on the received signal. Specifically, the fuel injection control module 470 may adjust fuel injection when a stuck fuel injector is detected. For example, the fuel injection control module 470 could increase fuel injection following detection of a stuck fuel injector. The fuel injection control module 470 may then generate a control signal for the solenoid driver based on an adjusted fuel injection period. For example, the control signal may be a PWM control signal. In addition, the fuel injection control module 470 could generate a failure signal or set a flag when a stuck fuel injector is detected. The failure signal or flag could be used for diagnostic purposes.

As shown, the system or method of the present disclosure may be implemented entirely within the control module 150. More specifically, the stuck fuel injector detection may be performed completely within the control module 150, and the result of the failed pulse detection may be used by the control module 150 for subsequent fuel injection control. Alternatively, the system or method of the present disclosure may be implemented at least partially outside of the control module 150. More specifically, the transition period determination and/or the stuck fuel injector detection may be performed by a fuel injector driver ASIC (i.e., a separate fuel injection control module).

Fuel injector problems can develop for a number of reasons. The fuel injector 114 may become clogged or worn, preventing efficient operation. Additionally or alternatively, the windings of the fuel injector 114 may become shorted or open. Referring again to FIG. 6, the voltage trace 500 can show basic faults in the fuel injector coil, such as a stuck injector. Specifically, the voltage trace 500 dips in voltage when the fuel injector 114 closes. If there is no dip, the fuel injector 114 is stuck. If the dip is later on one fuel injector compared the others, that fuel injector is slow, causing the corresponding cylinder to run rich. During the period when the needle 260 returns to the closed position, the voltage supplying the current is monitored by the transition period waveform monitor module 450 by input from the voltage/current sensing circuit 420.

Figure 7:
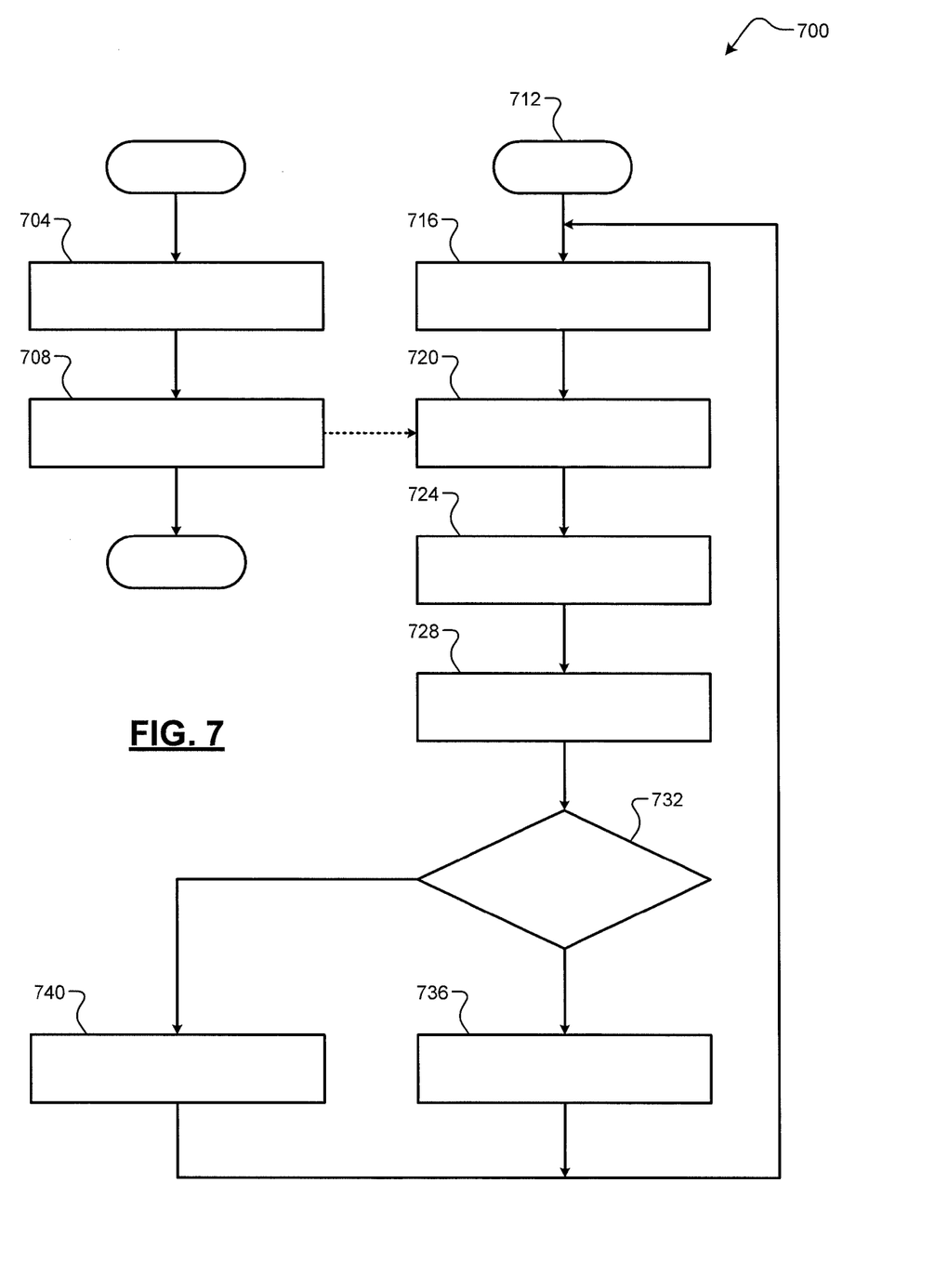
FIG. 7 is a flow diagram of an example method for detecting a stuck fuel injector according to one implementation of the present disclosure.

Referring now to FIG. 7, a flow chart of a program 700 to be executed by the control module 150 is shown. For example, the program can be executed by the plurality of processors 400 or, more specifically, the stuck fuel injector detection module 460. Before the program is enabled, a time constant is estimated for the first order injector voltage decay response upon transition for a stuck fuel injector at 704. The average time constant estimate T can then be stored in memory 708. When the program has been enabled at 712 and after the injector is commanded off (deactivated), solenoid voltage is sampled at a predetermined voltage level during injector voltage decay and assigned a value to a variable (K) at 716. An initial condition response of the first order filter with initial value K and time constant T is then computed at 720. The difference with measured injector during decay is computed and then integrated over a pre-determined sampled time window at 724 and 728, respectively. The integrated difference is then compared to a threshold at 732. If the integrated difference is less than the threshold, the stuck fuel injector flag is set to fault (or "1") at 736. Control can then end or return to 712 for one or more additional cycles. If the integrated difference is greater than or equal to the threshold, the stuck fuel injector flag is set to no fault (or "0") at 740. Control can then end or return to 712 for one or more additional cycles.

Figure 8:
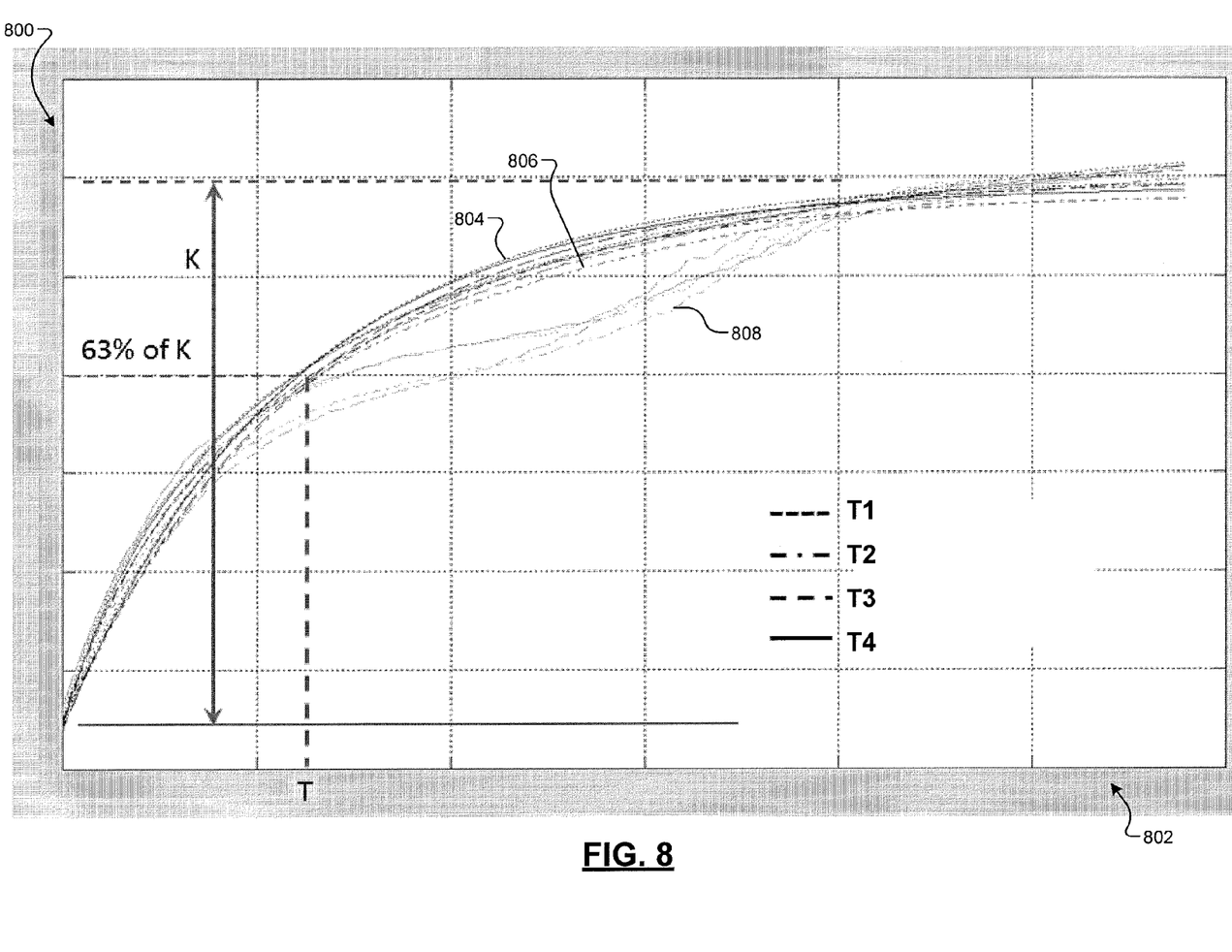
FIG. 8 is a graph illustrating simulated results of the method of FIG. 7 as applied to the different pulse durations of FIG. 5.

Referring again to FIG. 5, the four circled regions of the voltage traces represent four different pulse durations. These may now be sampled and executed by program 700 of FIG. 7. Even though the pulses are of four different durations, the response of the fuel injectors, either normal or stuck, is fairly consistent. As described in the program 700, the four traces of the stuck injector are modeled by a first order system response to estimate the time constant T and initial value K as shown in FIG. 8. A vertical axis 800 represents voltage and a horizontal axis 802 represents time. Curves 804 represent the estimated (or modeled) injector pulses, curves 806 represent the stuck injector pulses, and curves 808 represent normal injector pulses. These curves include a curve for each pulse duration (A-D, or 484A-484D, respectively). As shown in FIG. 8, the estimated models can accurately predict the behavior of a stuck fuel injector with four different pulse durations.

Figure 9:
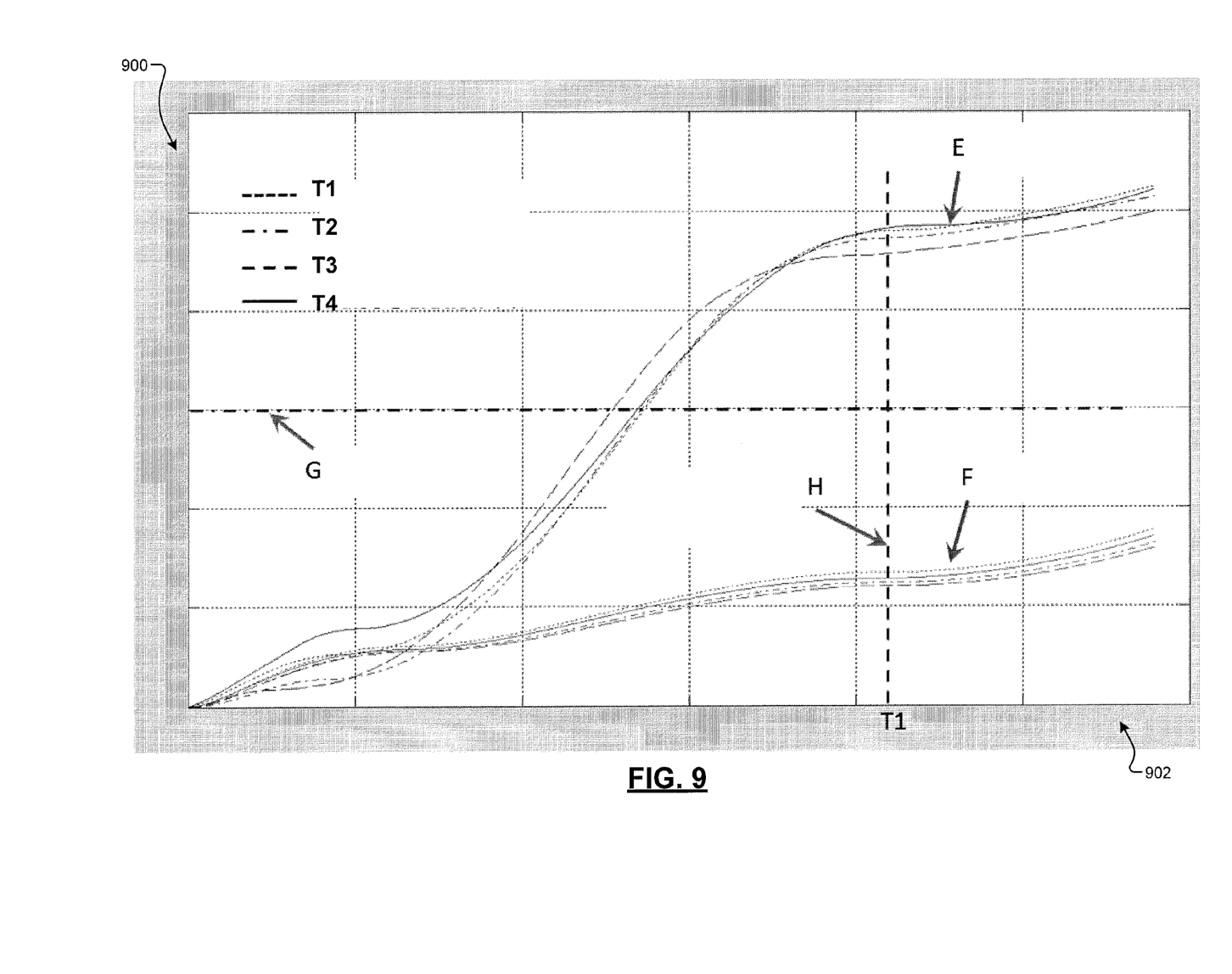
FIG. 9 is a graph illustrating an integrated difference for normal and stuck fuel injectors with respect to a threshold and being captured at a predetermined time.

Referring now to FIG. 9, the integrated difference for a stuck fuel injector (trace bundle E) and a normal fuel injector (trace bundle F) are shown with four different pulse durations. A vertical axis 900 represents integrated difference and a horizontal axis 902 represents time. As described in program 700, a threshold (line G) can be established at a predetermined time T1 (line H). As clearly shown by the plot, the threshold can be used to discriminate between normal and failed fuel injectors as shown in FIG. 9. The calculated integrated difference can then be compared to the threshold at T1, after the injector is turned off, in order to detect whether the fuel injector is malfunctioning (in real time). It should be appreciated that while a first order filter is described herein, other modeling techniques can be implemented. Other modeling techniques can include, but are not limited to, arc tangent and polynomial curve fittings.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, the control system comprising:
   a transition period waveform monitor module that measures an electrical signal of a fuel injector during a transition period when the fuel injector transitions from an open position to a closed position;
   a stuck fuel injector detection module that detects a stuck fuel injector when an accumulated deviation of the electrical signal from a parameterized estimated reference waveform is outside of a predetermined range; and
   a fuel injection control module that controls fuel injection in the engine based on the detection of the stuck fuel injector.

2. The control system of claim 1, wherein the stuck fuel injector detection module detects the stuck fuel injector further based on at least one of a plurality of engine operating parameters.

3. The control system of claim 2, wherein the plurality of engine operating parameters include air/fuel imbalance, engine speed, and individual cylinder fuel control.

4. The control system of claim 1, wherein the stuck fuel injector detection module determines the accumulated deviation based on magnetic flux decay in a solenoid of the fuel injector.

5. The control system of claim 4, wherein the stuck fuel injector detection module determines the magnetic flux decay based on at least one of current flowing through the solenoid and a voltage drop across the solenoid.

6. The control system of claim 5, wherein the stuck fuel injector detection module determines the accumulated deviation further based on fuel rail pressure and cylinder pressure.

7. The control system of claim 1, wherein the stuck fuel injector detection module determines the accumulated deviation of the electrical signal from the parameterized estimated reference waveform during the transition period of the fuel injector.

8. The control system of claim 1, wherein the fuel injection control module adjusts fuel injection when the stuck fuel injector is detected.

9. The control system of claim 1, wherein the fuel injection control module maintains normal fuel injection when the stuck fuel injector is not detected.

10. The control system of claim 1, wherein the fuel injection control module at least one of generates a failure signal and sets a flag when the stuck fuel injector is detected.

11. A method for controlling an engine, the method comprising:
    measuring an electrical signal of a fuel injector during a transition period when the fuel injector transitions from an open position to a closed position;

detecting a stuck fuel injector when an accumulated deviation of the electrical signal from a parameterized estimated reference waveform is outside of a predetermined range; and controlling fuel injection in the engine based on the detection of the stuck fuel injector.

12. The method of claim 11, wherein detecting the stuck fuel injector is further based on at least one of a plurality of engine operating parameters.

13. The method of claim 12, wherein the plurality of engine operating parameters include air/fuel imbalance, engine speed, and individual cylinder fuel control.

14. The method of claim 11, wherein determining the accumulated deviation is based on magnetic flux decay in a solenoid of the fuel injector.

15. The method of claim 14, further comprising determining the magnetic flux decay based on at least one of current flowing through the solenoid and a voltage drop across the solenoid.

16. The method of claim 15, wherein determining the accumulated deviation is further based on fuel rail pressure and cylinder pressure.

17. The method of claim 11, wherein determining the accumulated deviation of the electrical signal from the parameterized estimated reference waveform is performed during the transition period of the fuel injector.

18. The method of claim 11, wherein controlling fuel injection in the engine based on the detection of the stuck fuel injector includes adjusting fuel injection when the stuck fuel injector is detected.

19. The method of claim 11, wherein controlling fuel injection in the engine based on the detection of the stuck fuel injector includes maintaining normal fuel injection when the stuck fuel injector is not detected.

20. The method of claim 11, further comprising at least one of generating a failure signal and setting a flag when the stuck fuel injector is detected.

* * * * *